United States Patent [19]

Perry

[11] Patent Number: 5,553,225
[45] Date of Patent: Sep. 3, 1996

[54] METHOD AND APPARATUS FOR COMBINING A ZOOM FUNCTION IN SCROLL BAR SLIDERS

[75] Inventor: Phil M. Perry, Bearsville, N.Y.

[73] Assignee: International Business Machines Corporation, Armonk, N.Y.

[21] Appl. No.: 329,123

[22] Filed: Oct. 25, 1994

[51] Int. Cl.$^6$ .................................................. G06F 3/00
[52] U.S. Cl. .......................... 395/157; 395/159; 395/139
[58] Field of Search .................................. 395/155–161, 395/139; 345/117–120, 131, 123

[56] References Cited

U.S. PATENT DOCUMENTS

| | | |
|---|---|---|
| 4,417,239 | 11/1983 | Demke et al. . |
| 4,574,364 | 3/1986 | Tabata et al. . |
| 4,608,656 | 8/1986 | Tanaka et al. . |
| 4,786,897 | 11/1988 | Takanashi et al. . |
| 4,790,028 | 12/1988 | Ramage . |
| 4,831,556 | 5/1989 | Oono . |
| 4,893,258 | 1/1990 | Sakuragi . |
| 4,961,072 | 10/1990 | Sekikawa . |
| 5,001,697 | 3/1991 | Torres . |
| 5,039,937 | 8/1991 | Mandt et al. ................. 395/157 X |
| 5,051,927 | 9/1991 | Tada et al. . |
| 5,175,813 | 12/1992 | Golding et al. . |
| 5,187,776 | 2/1993 | Yanker . |
| 5,208,588 | 5/1993 | Nishiyama . |
| 5,347,628 | 9/1994 | Brewer et al. .................. 395/159 |
| 5,375,199 | 12/1994 | Harrow et al. ................. 395/159 |
| 5,491,781 | 2/1996 | Gasperina ..................... 395/157 |

FOREIGN PATENT DOCUMENTS 4075093  3/1992  Japan ................. G06F 3/14

OTHER PUBLICATIONS

Myers, "A Taxonomy of Window Manager User Interfaces", IEEE, Sep. 1988, pp. 65–84.

Advanced Interface Design Guide, IBM, Jun. 1989, pp. 25, 30–31, 59–61.

*Primary Examiner*—Mark R. Powell
*Assistant Examiner*—John E. Breene
*Attorney, Agent, or Firm*—Lily Neff; Marc A. Ehrlich; C. Lamont Whitham

[57] ABSTRACT

The screen display scale is changed in an easy and intuitive manner, without intermediate steps or operations, and without taking up additional screen display area. At least one so-called scroll bar must be displayed on the screen and be functional at any time that the scale could be changed by the user. Additional function is loaded onto screen scroll bars to support the change of scale function as well as the scrolling function. The scroll bar is composed of a bar and a slider, and the slider position and size respectively indicate the location of working area relative to the virtual screen and the relative size of the working area as a function of the total size of the virtual screen area. Scrolling, or panning, is accomplished by moving the slider within the bar. In addition, the size of the slider can be changed in order to effect a change in the scale of the working area, thereby providing a zoom function for the scroll bar. The size of the slider can be changed in a number of ways, but all of them are intuitive and easily used by the user without requiring either intermediate steps or operations or taking up additional screen display area.

21 Claims, 11 Drawing Sheets

METHOD AND APPARATUS FOR COMBINING A ZOOM FUNCTION IN SCROLL BAR SLIDERS

BACKGROUND OF THE INVENTION

1. Field of the Invention

The present invention generally relates to computer user interfaces presented on a display screen and, more particularly, to a graphic user interface (GUI) which easily accomplishes both a scale change function with a panning or scrolling function.

2. Description of the Prior Art

In many computer application programs, and in particular graphics programs such as computer aided design and drafting (CAD) programs, the drawing is much larger than the physical display. The physical display shows the "working area" of the drawing which is some subset of the entire drawing or map, sometimes referred to as the "virtual screen". That is, the physical screen size, which is determined by the physical dimensions of the display device connected to the computer system, typically displays only a portion of the total drawing or map. This portion of the total drawing or map, or the "working area", is the current area of interest for viewing, drawing or editing. CAD programs therefore implement a scrolling function, called panning, to allow the user to move about in the virtual screen thereby changing the working area, and a scaling function, called zooming, to allow the user to view either a larger or smaller portion of the working area, depending on the level of detail that the user wishes to see.

Any sort of drawing or viewing program requires a means of moving around, by scrolling or panning, a virtual screen which may be larger than the physical screen area, as well as a means of changing scale (to zoom in or zoom out). For panning control, the use of scroll bars is well established, but there is no method in common use for changing the display scale. There are, in fact, a multitude of ways to change the display scale; however, all require extra steps by the user and/or take up screen space that could be better used for the task at hand. For example, there are many methods in use for changing the display's scale that involve bringing up additional controls or interfaces on the screen. These include, but are not limited to, prompted entry fields, sliders, spin buttons, single-selection (radio) buttons, multiplier buttons (e.g., 2×, ½× scale), etc. found within pull-down menus, pop-up dialogues, fixed screen areas, etc. All of these methods have one thing in common, and that is they take up space on the display that could better be used for an end task, such as a CAD drawing or a map. Additionally, some require one or more extra operations to invoke them (e.g., select Menu Bar options, then select Scale Change from the pull-down menu's list).

SUMMARY OF THE INVENTION

It is therefore an object of the present invention to provide a method of changing the screen display scale in an easy and intuitive manner, without intermediate steps or operations, and without taking up additional screen display area.

According to the invention, there is provided a method which requires that at least one so-called scroll bar be displayed on the screen and be functional at any time that the scale could be changed by the user. More particularly, the method according to the invention loads additional function onto screen scroll bars to support the change of scale function as well as the scrolling function. The scroll bar is composed of a bar and a slider, and the slider position and size respectively indicate the location of working area relative to the virtual screen and the relative size of the working area as a function of the total size of the virtual screen area, as is conventional. Scrolling, or panning, is accomplished by moving the slider within the bar, as is also conventional. However, according to the invention, the size of the slider can be changed in order to effect a change in the scale of the working area, thereby providing a zoom function for the scroll bar. The size of the slider can be changed in a number of ways, but all of them are intuitive and easily used by the user without requiring either intermediate steps or operations or taking up additional screen display area.

This method is available at all times and provides an additional function for existing constructs (i.e., scroll bars). This solution is most useful for quick, approximate changes to the display scale. Due to the imprecise nature of input devices, such as pointing cursor devices, it would be difficult for a user to enter a precise desired scale (e.g., 5000:1). Such precise sealing is not commonly needed until it is time to make hardcopy output, and then an existing solution such as an entry field would be more appropriate.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
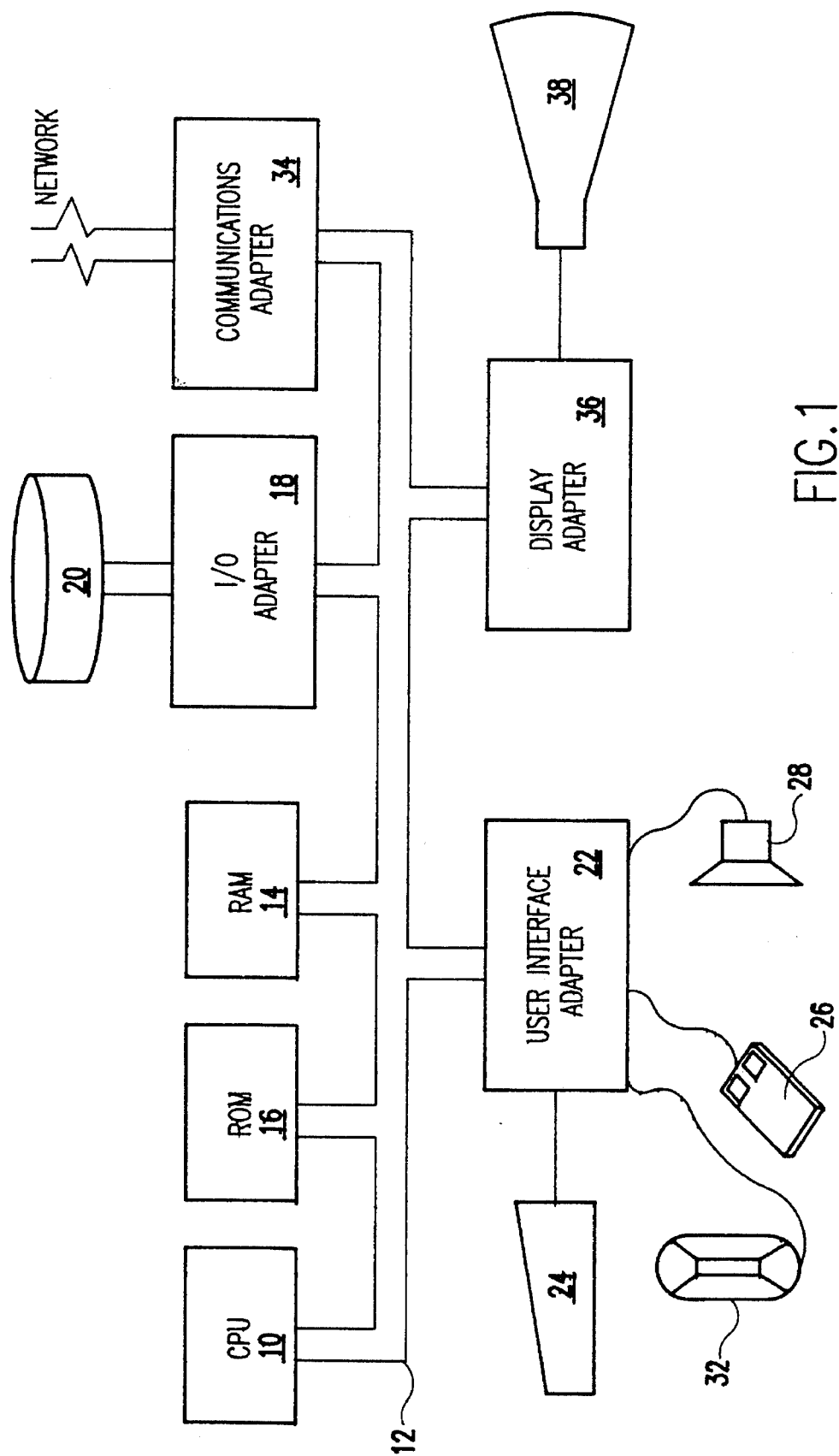
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a personal computer such as the International Business Machines (IBM) Corporation's PS/2 Personal Computers or a workstation such as IBM's RS/6000 Workstations. The hardware includes a central processing unit (CPU) 10, which may be a complex instruction set computer (CISC) microprocessor such as the Intel 386, 486 or Pentium microprocessors, generally referred to as X86 microprocessors, or a reduced instruction set computer (RISC) microprocessor such as IBM's PowerPC microprocessor. The CPU 10 is attached to a system bus 12 to which are attached a random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) and boot code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The I/O adapter 18 may support, for example, the Integrated Device Electronics (IDE) interface standard or the SCSI interface standard. In the former case, the I/O adapter 18 typically will support two disk drives in parallel, designated as drives "C:" and "D:". In the latter case, the I/O adapter 18 will support up to seven disk drives or other SCSI I/O devices connected in a daisy chain. The user interface adapter 22 has attached to it a keyboard 24, a mouse 26, a speaker 28, a microphone 32, and/or other user interface devices (not shown). Most typically, the mouse 26 is a two button mouse but in some applications may be a one button mouse, although a three button mouse may be used. A display 38, here represented as a cathode ray tube (CRT) display but which may be a liquid crystal display (LCD), is connected to the system bus 12 via a display adapter 34. Optionally, a communications adapter 34 is connected to the bus 12 and to a network, such as a local area network (LAN), such as IBM's Token Ring LAN. Alternatively, the communications adapter may be a modem connecting the personal computer or workstation to a telephone line as part of a wide area network (WAN).

Figure 2:
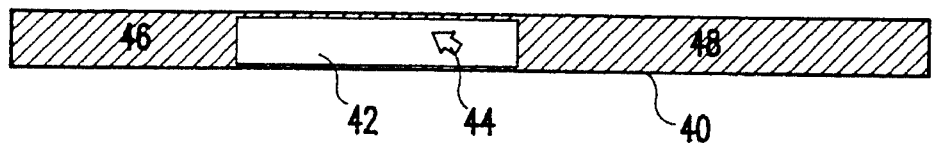
FIG. 2 is an illustration of a horizontal scroll bar as viewed on a computer display screen.

The screen of display 38 typically provides a user interface to inputting commands or accessing functions such as scrolling and panning. To better understand the invention, the function of a scroll bar will first be reviewed. Scroll bars control panning (scrolling) along one direction of the screen. There may be one for vertical or "Y direction" scroll and/or one for horizontal or "X direction" scrolling. It is possible in three dimension (3-D) programs to have a depth or "Z direction" scroll bar. The principal components of a scroll bar are as shown in FIG. 2 as comprising a rectangular bar 40 within which is a slider 42. The slider 42 is typically moved by selecting and dragging it using a pointing cursor 44 controlled by the mouse 26 or other pointing device. More particularly, the pointing cursor 44 displayed on the display screen is placed over the slider 42 as generally indicated in FIG. 2, the left mouse button (in a two button mouse) is depressed and held while the mouse is moved to the left or right to move the slider 42, and finally the button is released when the slider 42 is at the desired location on the bar 40. Space 46 to the left of the slider indicates that part of the virtual screen is "off screen" to the left. If the slider 42 is moved to the left, this part of the virtual screen is brought "on screen"; i.e. , into the working area and displayed on the physical screen. The slider 42 indicates by its size and position that approximately 25% of the virtual screen (from one quarter to one half) in the horizontal direction is visible in the working area on the physical display. The unoccupied space 48 to the right of slider 42 indicates that part of the virtual screen is "off screen" to the right. If the slider 42 is moved to the right, this part of the virtual screen is brought "on screen". While a horizontal scroll bar (for controlling left and right scrolling) is illustrated, the vertical scroll bar has a similar layout and function. There are a number of minor variations in appearance and additional functions, but they are not of concern to an understanding of this invention.

Figure 3A:
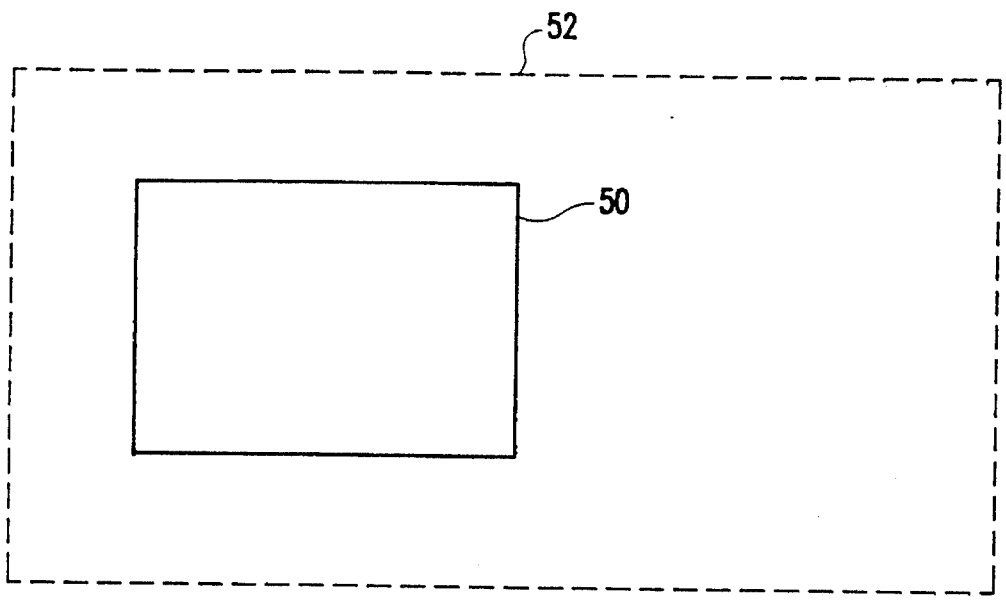
FIG. 3A is an illustration showing the relationship of a working area to a virtual screen.
Figure 3B:
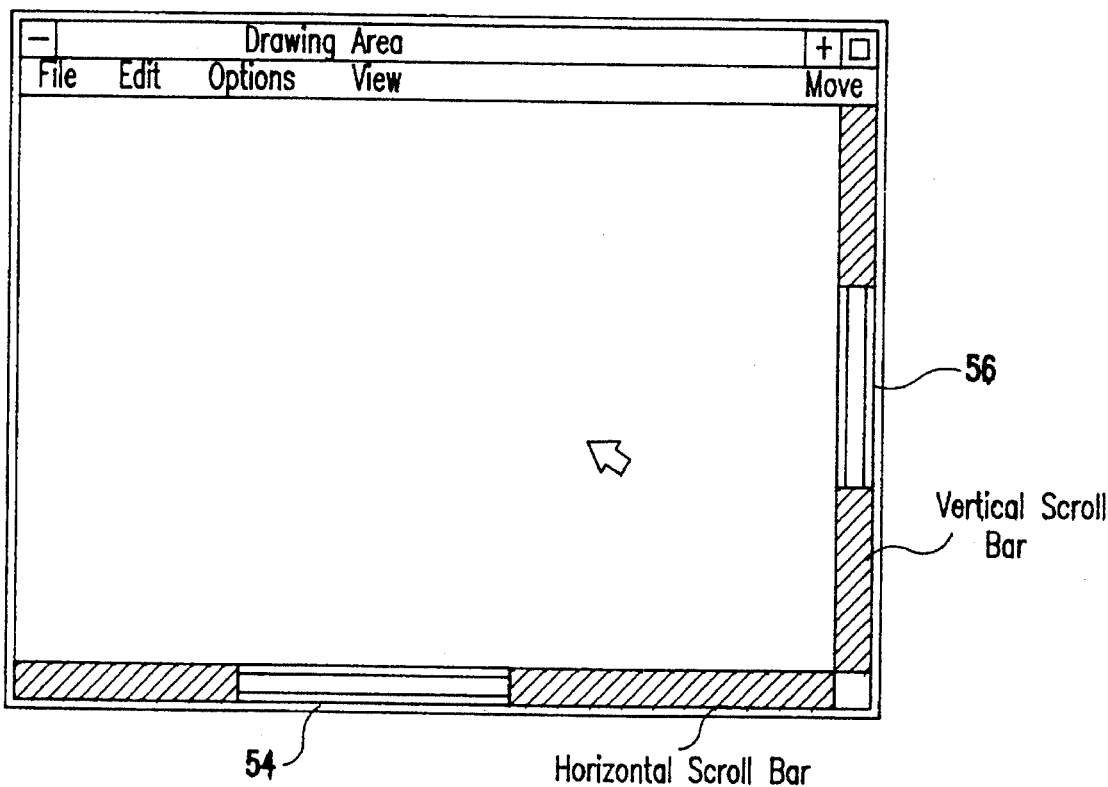
FIG. 3B is an illustration showing typical locations of horizontal and vertical scroll bars relative to the working area on the physical display screen.

A virtual screen is the total drawing area in the application, such as the entire drawing or map. At less than maximum scale, only a portion of the virtual screen, that is the working area, may be shown on the physical display at any given time. The displayed portion is both indicated and controlled by the scroll bar(s). An example of a virtual screen is shown in FIG. 3A, where the solid rectangle 50 represents the working area (i.e., that portion of the virtual screen denoted by the dotted rectangle 52) displayed on the physical display. In FIG. 3B, the physical screen display only is shown, where 54 and 56 respectively indicate the horizontal and vertical sliders.

The size (length) of the slider is a function of the display scale and the size of the virtual screen. For a given scale, as the virtual screen size increases in that dimension, the slider would become shorter (indicating that a smaller fraction of the virtual screen is being displayed). For a given virtual screen size, as the scale increases ("zooming out") the slider becomes longer (indicating that a larger fraction of the virtual screen is being displayed). The position of the slider within the scroll bar directly indicates the beginning and end of the displayed area of the virtual screen, and therefore indirectly gives the position of the "center of interest" (at the center of the slider).

As widely implemented, the size (length) of the slider in the scroll bar is an "output only" function of the scale and virtual screen size. The method according to the invention adds an "input" functionality by enabling the user to directly change the slider's length, thereby changing the display scale. The advantage of this is that it is intuitive and rapid, making the slider larger to show more of the virtual screen (zoom out to a larger scale), or making it smaller to show more detail on a smaller part of the virtual screen (zoom in to a smaller scale).

The user is able to change the size (length) of the slider in several alternate ways, of which only one would typically be implemented on any given system. Using a two button mouse, the user can press the right button to either drag one end of the slider along the length of the scroll bar or click that button on the slider or in the empty area of the scroll bar. Using a one button mouse, the user can select one edge (end) of the slider and then drag that edge in order to change the size of the slider. The resizing of the slider, typically at both ends, results in a change of scale keeping the Center of Interest fixed.

Figure 4:
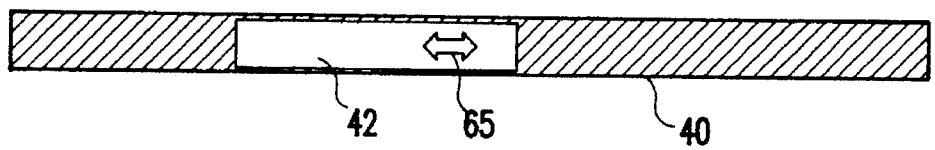
FIGS. 4 to 6 are illustrations similar to that shown in FIG. 2 showing a first method in the practice of the invention.
Figure 5:
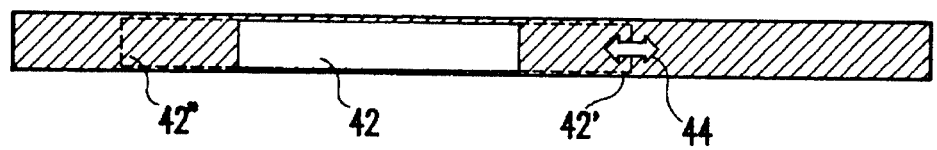

In FIG. 4, the initial position 65 of the pointing cursor is within the slider and the right mouse button has been pressed. Note that different pointer style is used in response to pressing the right mouse button so that the user may distinguish the function. The pointing cursor may be moved to the right to enlarge the slider 42. In FIG. 5, the end of the slider 42 is being pulled right, enlarging it, while the right mouse button is held down. Typically, some sort of ghost or outline slider 42' will be shown so that the user may gauge the extent of the change. The opposite end of the slider 42 will typically mirror the changes at the one end, as indicated by the ghost or outline slider 42", so that the Center of Interest is not moved. The maximum extension of the slider 42 without changing the Center of Interest is delimited by the closest edge of the bar 40. Beyond that, the end of the slider 42 would reach the limit of the virtual screen, and the Center of Interest would then move to the right with increased enlargement of the slider 42, effecting a panning operation with the zoom operation. The maximum extension of the slider would be at both ends of the bar 40.

Figure 6:
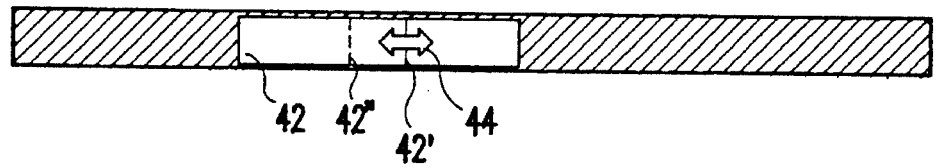

In FIG. 6, the pointing cursor 44 has been moved inside the slider 42 (after the cursor has been moved at least to the right edge of the slider 42 in order to "pick up" the ghost slider or outline 42') so that the slider size is reduced when the right mouse button is released at this point. Again, the opposite end of the slider 42 will mirror the change made to the other end, as indicated at 42". The Center of the slider 42, the Center of Interest, is the limit for shrinking the slider. Typically, there will be no effect if right mouse button is released when the pointer has passed the center of the slider, as this would create a slider size of less than or equal to zero. An alternate implementation would be to drop the edge of the ghost slider and pick up the opposite edge (drop 42' and pick up 42").

Figure 7A:
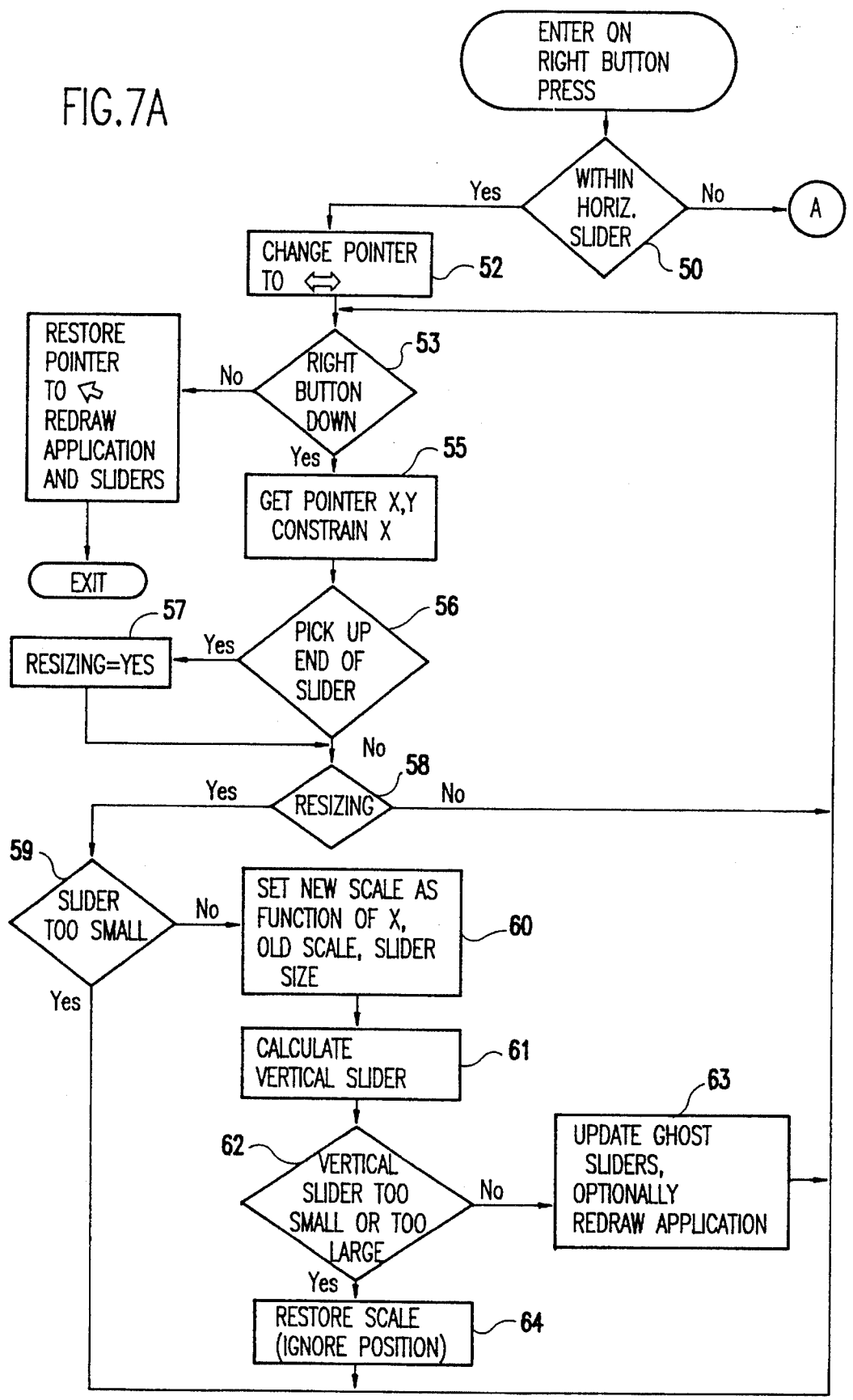
FIGS. 7A and 7B are is a flow chart showing the logic of the process according to the first method.
Figure 7B:
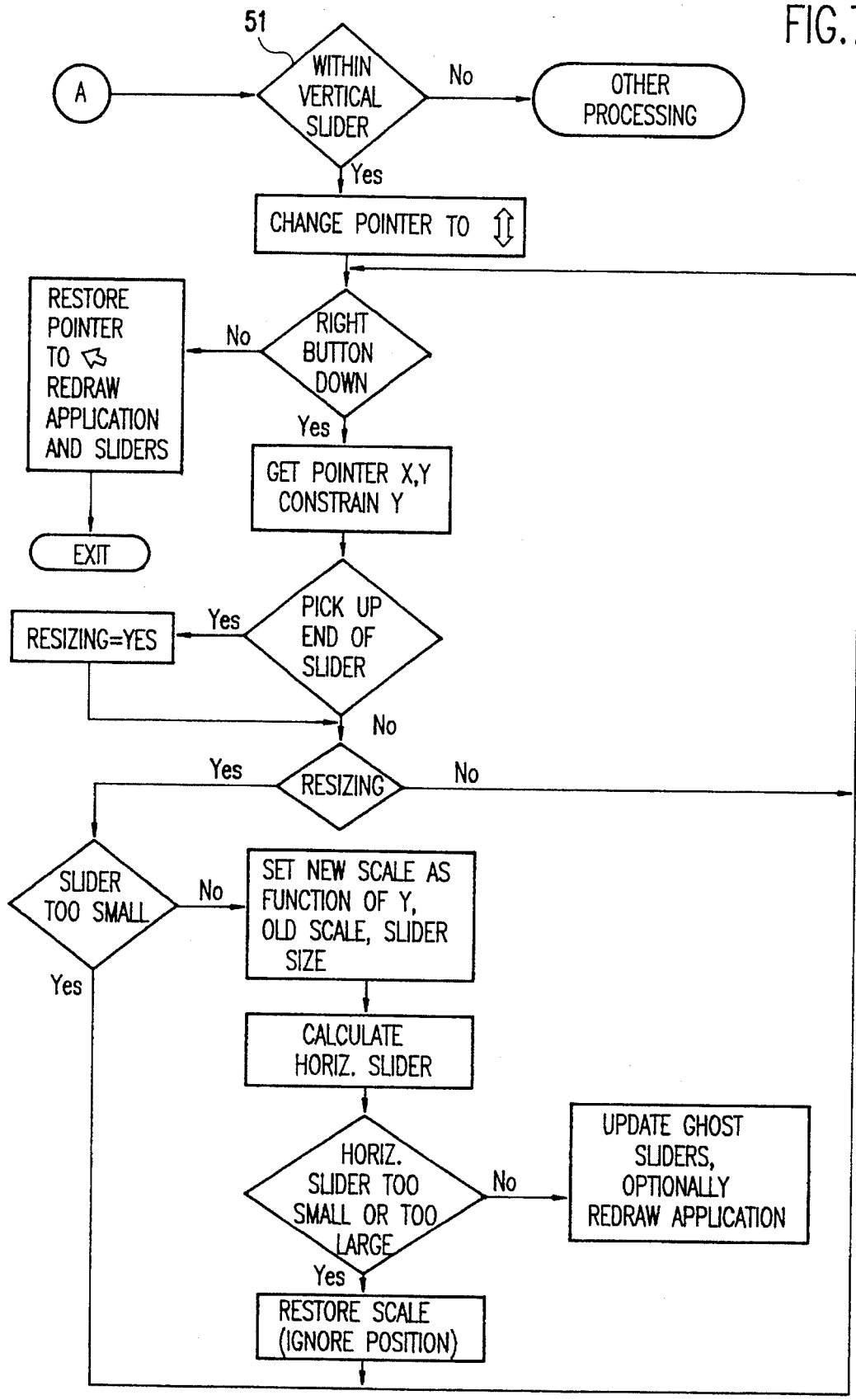
Figure 8:
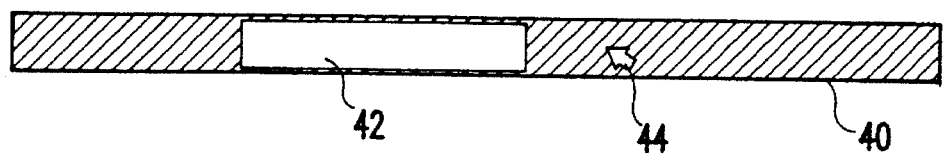
FIGS. 8 to 11 are illustrations similar to that shown in FIG. 2 showing a second method in the practice of the invention.

FIGS. 7A and 7B, taken together, are is a flowchart showing the logic of the process described with respect to FIGS. 4 to 6. Starting in FIG. 7A, the process begins when the right mouse button is pressed. A test is first made in decision block 50 to determine if the cursor is within the horizontal slider. If not, a test is made in decision block 51 in FIG. 7B to determine if the cursor is within the vertical slider. If not, the press of the right mouse button is ignored (for this process), and other processing takes place. Assuming, however, that the cursor is detected to be within the horizontal slider, the pointing cursor is changed to a double headed cursor, as shown for example in FIG. 4, in function block 52. A test is then made in decision block 53 to determine if the right mouse button is still down. If not, that is the right mouse button has been released, the pointing cursor is restored in function block 54 and the process exits. Otherwise, the pointer coordinates X, Y are retrieved in function block 55. In addition, the maximum limits for the size of the slider are set in order to prevent panning. Next, in decision block 56, a test is made to determine if an end of the slider has been picked up by the cursor. If so, the condition currently_resizing is set to yes in function block 57. Then, in decision block 58 a test is made to determine if the condition currently_resizing is no. If so, the process loops back to decision block 53 where again a test is made to determine if the right mouse button has been released. If the condition currently_resizing is set to yes as determined in decision block 58, a test is then made in decision block 59 to determine whether the slider is being made too small. If not, the new scale of the drawing is set as a function of X, the old scale and the slider size in function block 60. Next, the vertical slider size is calculated as a function of the new drawing scale in function block 61. A test is made in decision block 62 to determine if the vertical slider is too small or too large. If not, the ghost sliders are updated in function block 63. Optionally, the drawing is redrawn to the new scale at this time. This option would be implemented, for example, if the computer on which the process is installed is capable of real time redrawing of the display screen. While this is desirable to provide a further level of user feedback, the redraw process on older computers may be too slow; therefore, the redraw operation would be delayed until the current process exits at function block 54. Should, however, the vertical slider be determined in decision block 62 to be too small or too large, the scale is restored in function block 64; that is, the scale set in function block 60 is ignored. The outputs of each of decision block 59 and function blocks 63 and 64 loop back to decision block 53 where, again, a test is made to determine if the right mouse button has been released. Since the process for the vertical slider is substantially identical to that for the horizontal slider, that process will not be described. It should be noted, however, that the scale of the drawing can be changed using either the horizontal or the vertical sliders. An alternative for certain special applications is to make the horizontal slider specific to horizontal scale and the vertical slider specific to vertical scale so that the scales can be independently changed. In such case, the process of function block 61 (and the corresponding process for the vertical slider) can be omitted, as well as function blocks 62 and 64.

Figure 9:
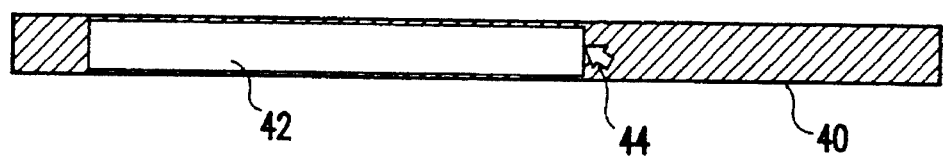
Figure 10:
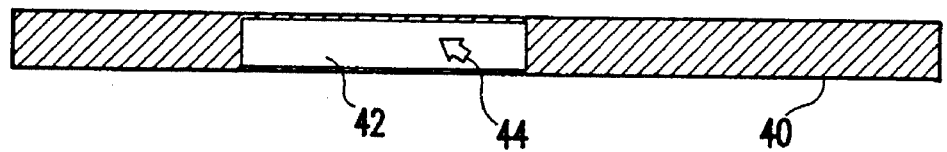
Figure 11:
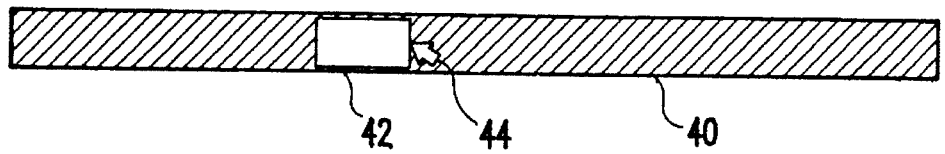

In an alternate method shown in FIGS. 8 to 11, the initial position of the pointing cursor 44 is outside the slider. Note that the normal pointer is used here, as no button is being pressed. If, now, the right mouse button is clicked (pressed and released), the slider would be lengthened (typically symmetrically about the center) by expanding it to the location of the pointing cursor, as shown in FIG. 9. Alternatively, the expansion of the slider can be made in incremental steps. That is, as long as the pointing cursor remains outside the slider within the scroll bar, each time the user clicks the right mouse button, the slider is incrementally expanded by a predetermined amount. The limits of this operation (i.e., expansion of the slider) are the location of the pointing cursor or an edge of the scroll bar, whichever occurs first. In FIG. 10, the pointing cursor is moved to a location within the slider 42 to shrink the size of the slider. If the right mouse button is clicked with the pointing cursor 44 in this position, the slider 42 shrinks in size to the location of the cursor 44, as shown in FIG. 11. Again, an alternative is an incremental resizing of the slider 42. The limits of this operation (i.e., shrinking of the slider) are the location of the pointing cursor or the minimum size of the slider, whichever occurs first. Thus, the user can decrease or increase the size of the slider by simply pointing to a position within the scroll bar or the slider itself and pressing the right mouse button. Alternatively, the resizing operation can be done incrementally in response to how many times the user clicks the right mouse button. A ghost or outline slider to assist the user may optionally appear within the scroll bar. Note that the overriding principle here is that the slider size is being changed by use of the screen pointing device.

Figure 12A:
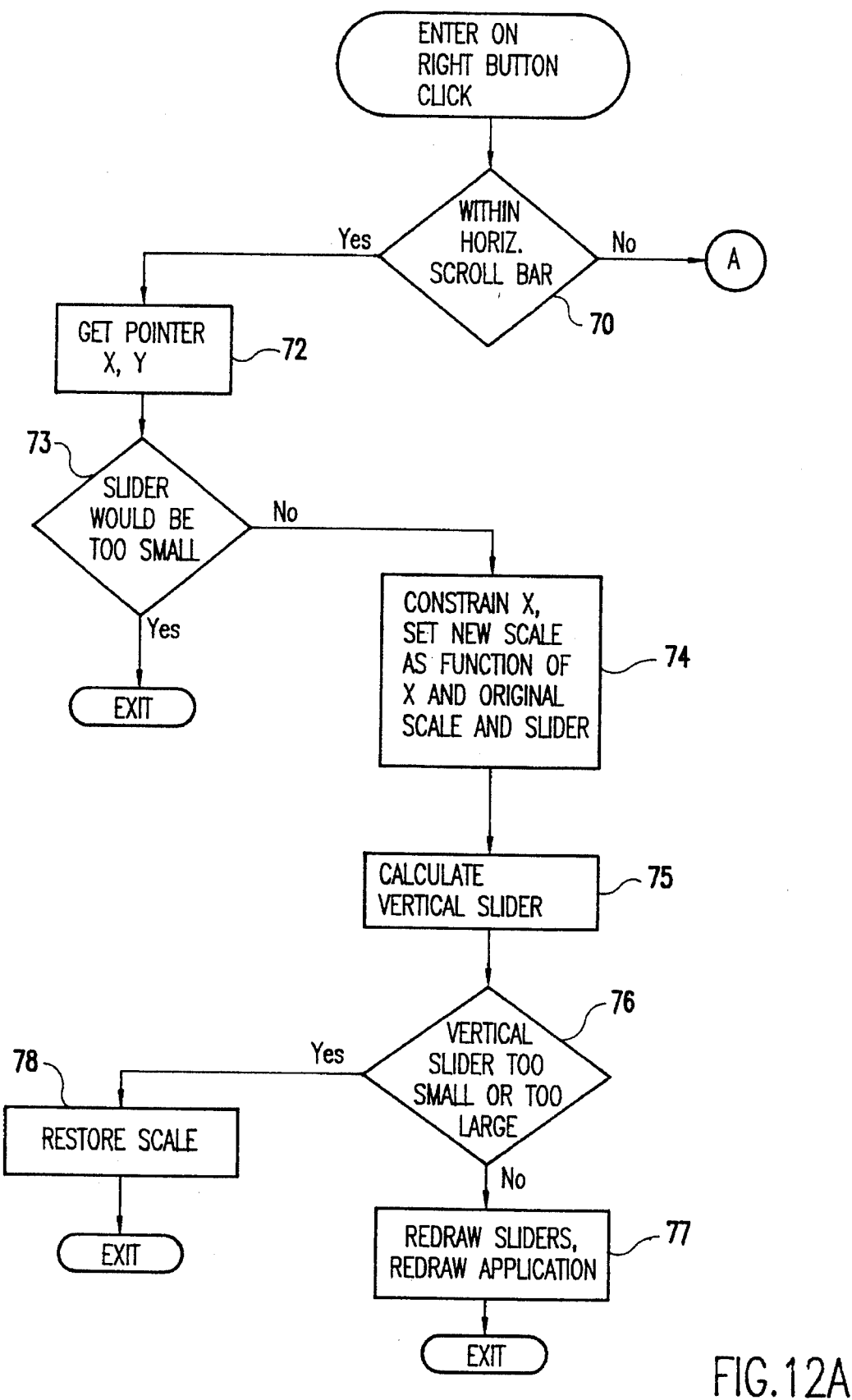
FIGS. 12A and 12B are is a flow chart showing the logic of the process according to the second method.
Figure 12B:
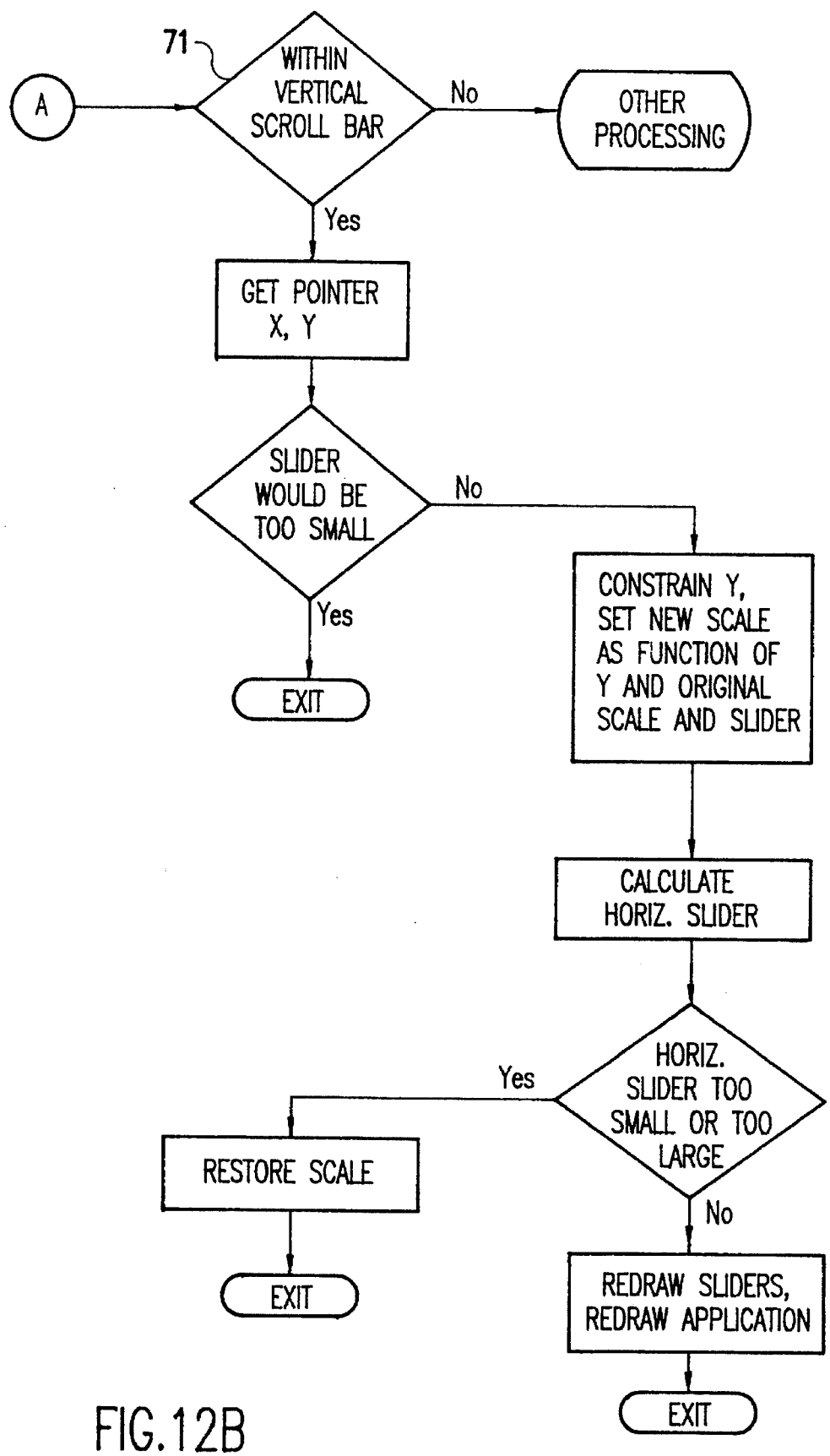

FIGS. 12A and 12B, taken together, are a flowchart showing the logic of the process described with respect to FIGS. 8 to 11. Starting in FIG. 12A, the process begins by detecting that the right mouse button has been clicked. A test is then made in decision block 70 to determine if the cursor is positioned within the horizontal slider. If not, a test is made in decision block 71 in FIG. 12B to determine if the cursor is within the vertical slider. If not, the press of the right mouse button is ignored (for this process), and other processing takes place. Assuming, however, that the cursor is detected to be within the horizontal slider, the pointer coordinates X, Y are retrieved in function block 72 in FIG. 12A. Based on the pointer coordinates, a test is made in decision block 73 to determine if the slider would be too small if rescaled to this point. If so, the process exits; otherwise, X is constrained to a maximum value to prevent panning and the new scale of the drawing is set as a function of X, the old scale and the slider size in function block 74. Next, the vertical slider size is calculated as a function of the new drawing scale in function block 75. A test is made in decision block 76 to determine if the vertical slider is too small or too large. If not, the sliders are redrawn and the drawing is redrawn in function block 77 before the process exits. Should, however, the vertical slider be determined in decision block 76 to be too small or too large, the scale is restored in function block 78; that is, the scale set in function block 74 is ignored, and the process exits. Again, the process for the vertical slider is substantially identical to that for the horizontal slider, and that process will not be described. As before, the scale of the drawing can be changed using either the horizontal or the vertical sliders. Also as before, an alternative for certain special applications is to make the horizontal slider specific to horizontal scale and the vertical slider specific to vertical scale so that the scales can be independently changed. In such case, the process of function block 75 (and the corresponding process for the vertical slider) can be omitted, as well as function blocks 76 and 78.

Figure 13:
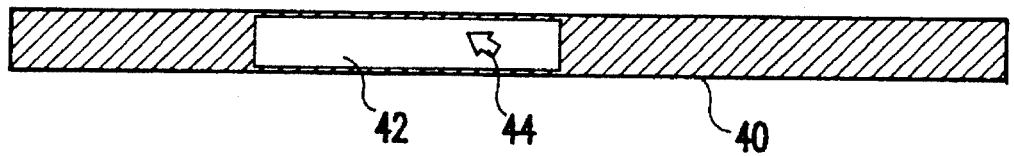
FIGS. 13 to 15 are illustrations similar to that shown in FIG. 2 showing a third method in the practice of the invention.
Figure 14:
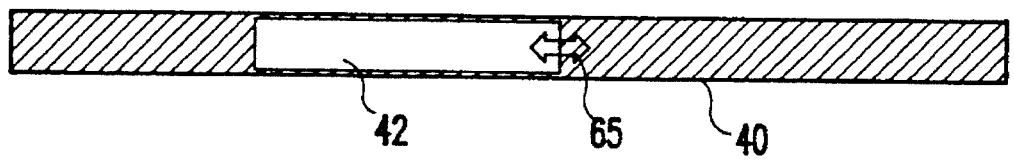
Figure 15:
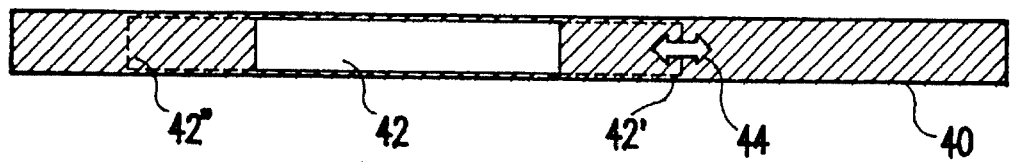

Some computer mice have only one button, such as the mouse used for the Apple Macintosh computers. The principles of the invention may be applied using a one button mouse (or to a two button mouse where the function is implemented with respect to the left mouse button only), as illustrated in FIGS. 13 to 15. In this ease, the pointing cursor is automatically changed when pointing at an end of the slider 42. For example, as shown in FIG. 13, the pointing cursor 44 is initially within the horizontal slider 42. As the cursor is moved to the right and encounters the right edge of the slider, the cursor is automatically changed to a double headed cursor, as shown in FIG. 14. Now, by pressing the mouse button and moving the cursor, the end of the slider 42 may be moved back and forth in order to change the size of the slider. This is very similar to common window resizing operations. Note that ghost slider ends 42' and 42" are generated to provide visual feedback to the user. Also, as in window resizing operations, the pointing cursor can start either within or outside the slider. At the point it crosses a slider end (either end), the pointing cursor is changed to the double headed cursor as shown in FIG. 14 to indicate to the user that a slider resizing operation may be performed.

Figure 16A:
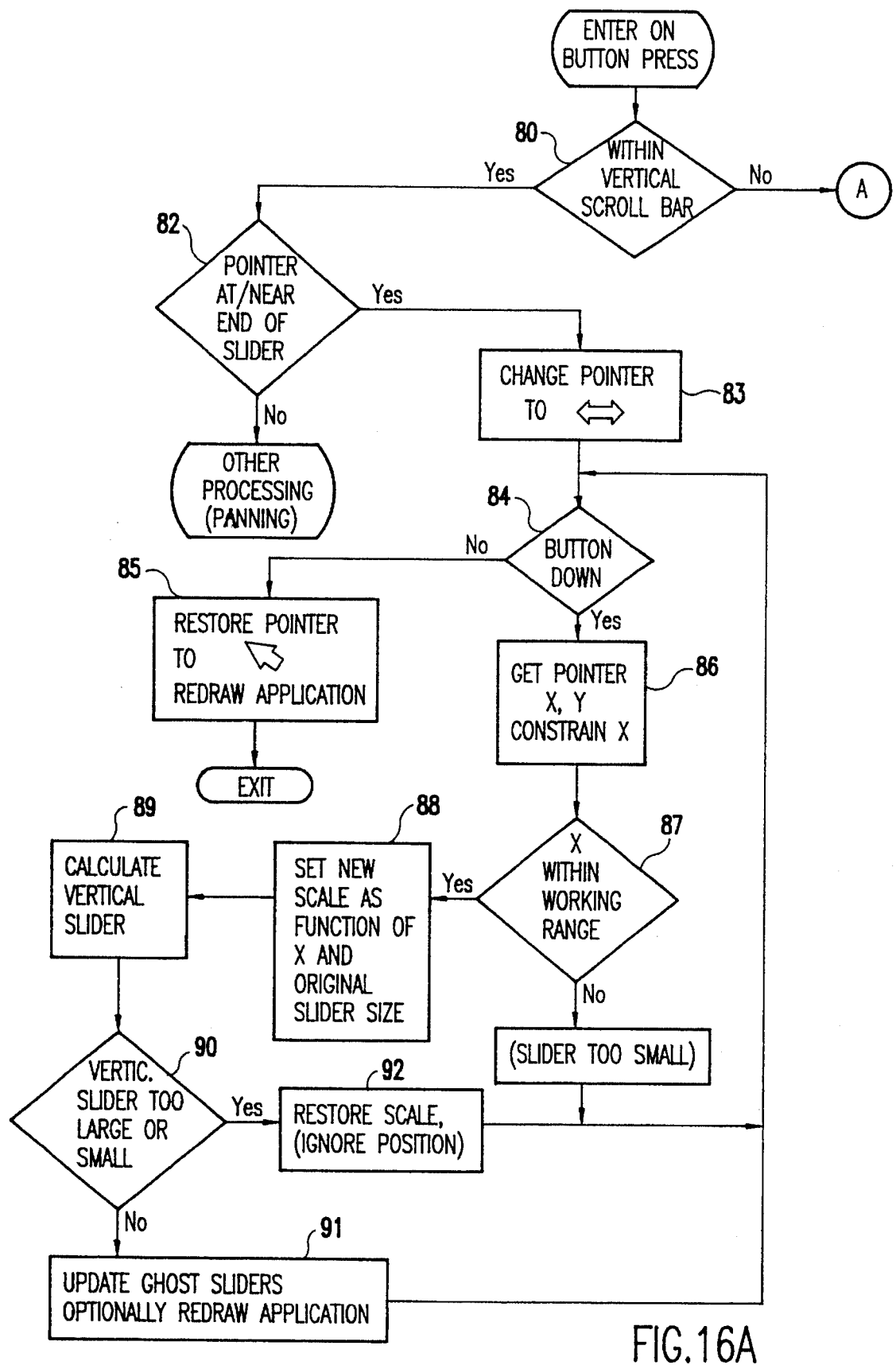
FIGS. 16A and 16B are is a flowchart showing the logic of the process according to the third method.
Figure 16B:
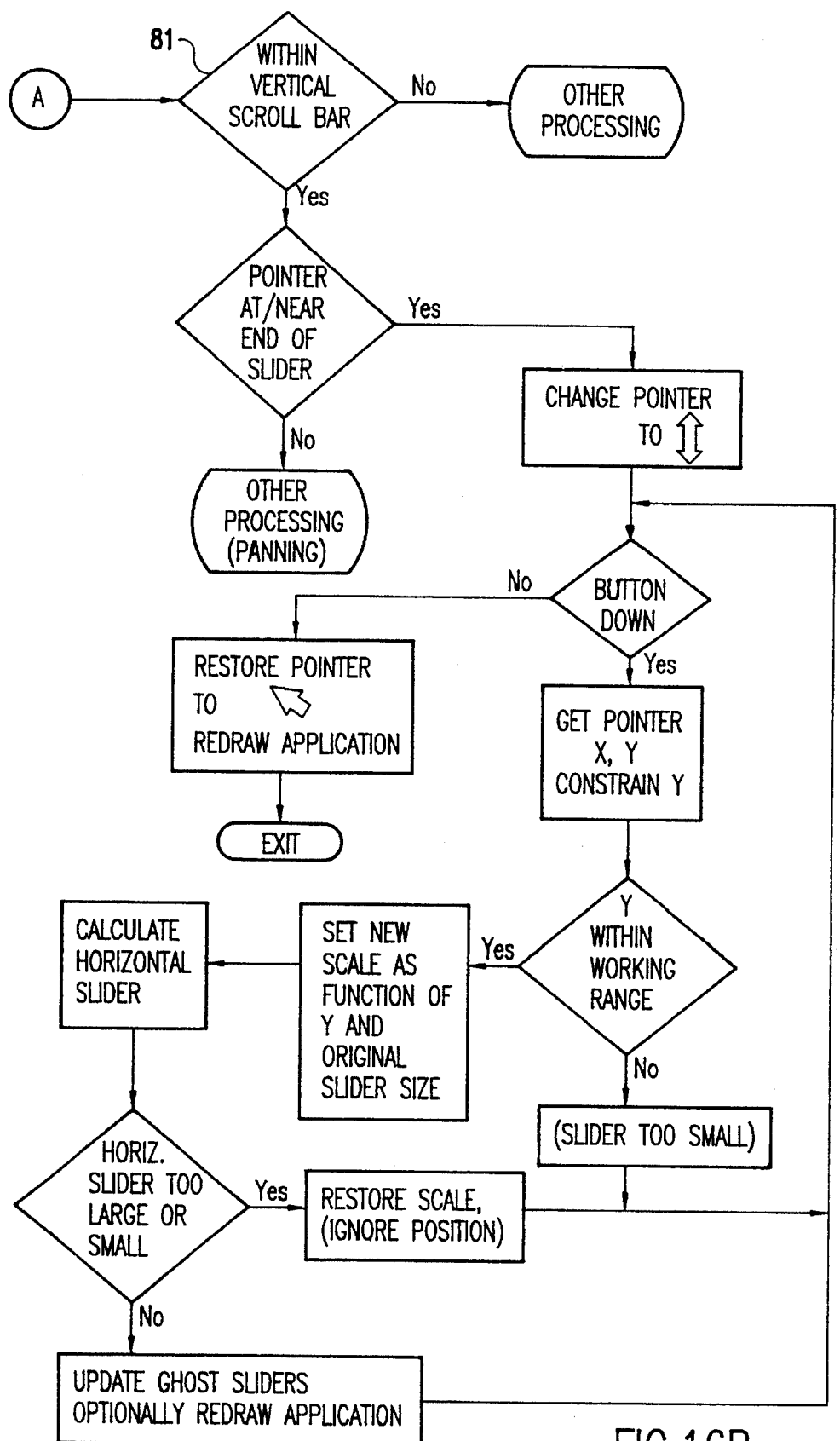

FIGS. 16A and 16B, taken together, are a flowchart showing the logic of the process described with respect to FIG. 11. Starting with FIG. 16A, the process begins by detecting a mouse button press, a test is made in decision block 80 as to whether the cursor is within the horizontal scroll bar. If not, a test is made in decision block 81 in FIG. 16B to determine if the cursor is within the vertical scroll bar. If not, the press of the mouse button is ignored (for this process), and other processing takes place. Assuming, however, that the cursor is detected to be within the horizontal scroll bar, a test is made in decision block 82 in FIG. 16A to determine if the pointing cursor is at or near an end of the slider. If so, the pointing cursor is changed to a double headed cursor, as shown for example in FIG. 14, in function block 83. A test is then made in decision block 84 to determine if the mouse button is still down. If not, that is the mouse button has been released, the pointing cursor is restored in function block 85 and the process exits. Otherwise, the pointer coordinates X,Y are retrieved in function block 86. In addition, X is constrained by setting the maximum limits for the size of the slider in order to prevent panning. Next, in decision block 87, a test is made to determine whether X is within the working range. If not, the slider is too small and the process loops back to decision block 84 to again determine if the mouse button has been released. Otherwise, the new scale of the drawing is set as a function of X, the old scale and the slider size in function block 88. Next, the vertical slider size is calculated as a function of the new drawing scale in function block 89. A test is made in decision block 90 to determine if the vertical slider is too small or too large. If not, the ghost sliders are updated in function block 91. Optionally, the drawing is redrawn to the new scale at this time. As in the first method, this option would be implemented, for example, if the computer on which the process is installed is capable of real time redrawing of the display screen. While this is desirable to provide a further level of user feedback, the redraw process on older computers may be too slow; therefore, the redraw operation would be delayed until the current process exits at function block 85. Should, however, the vertical slider be determined in decision block 90 to be too small or too large, the scale is restored in function block 92; that is, the scale set in function block 88 is ignored. The outputs of each of function blocks 91 and 92 loop back to decision block 84 where, again, a test is made to determine if the mouse button has been released. As in the discussions of the first two methods, the process for the vertical slider is substantially identical to that for the horizontal slider, and therefore the process will not be described. Also as in the first two methods, the scale of the drawing can be changed using either the horizontal or the vertical sliders. Again as in the first two methods, an alternative for certain special applications is to make the horizontal slider specific to horizontal scale and the vertical slider specific to vertical scale so that the scales can be independently changed. In such case, the process of function block 89 (and the corresponding process for the vertical slider) can be omitted, as well as function blocks 90 and 92.

There are other cursor and slider behavior alternatives. These are not meant to narrow the scope of the method according to the invention, but are merely included to give a better idea of the application of the method. Also keep in mind that while primarily a horizontal scroll bar has been illustrated, everything also applies to a vertically oriented scroll bar and, in 3-D applications, to a Z-direction scroll bar. This method is not a replacement for other means of entering the scale, but it is a quick and easy to use adjunct. Other methods of scale entry will still be needed if an exact scale is desired.

Typically, the scale change effected on one scroll bar would be applied immediately to other axes, if any, although this is not mandatory behavior; i.e., scales could be changed independently in the X, Y and even Z directions. Both the left and right buttons of a two button mouse could have "double click" behavior defined while the pointer is within the scroll bar. Double clicking the left button could center the displayed area with the virtual screen, and double clicking the right button could zoom out so the that display screen equals the virtual screen (fully zoomed out). Thus, while the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A method of changing a scale of a drawing in a computer graphics application program comprising the steps of:

displaying scroll bars along a plurality of axes of the drawing, said scroll bars each including a slider a position of which within the bar indicates a relative location of a working area relative to a virtual screen and a size of which indicates a relative size of the working area as a function of a total size of the virtual screen;

responding to a user selection of a slider of a first one of said scroll bars and performing a resizing operation on the slider; and changing a scale of the drawing as a function of the resizing of the slider while constraining a center of interest of the drawing to a fixed location within the working area of the drawing by calculating a size and location of the selected slider within the scroll bar as a result of the resizing operation, comparing the calculated size and location of the selected slider with maximum and minimum limits, ignoring a change in scale of the drawing beyond the maximum and minimum limits, thereby constraining the center of interest of the drawing, computing sizes of sliders of other scroll bars as a function of the resizing of the selected slider, computing the computed sizes of said sliders with maximum and minimum limits, and ignoring a change in scale of the drawing beyond the maximum and minimum limits of any of said sliders, thereby constraining the center of interest of the drawing.

2. The method as in claim 1 wherein said user selection of the slider and performing a resizing operation is performed using a two button pointing device and comprises the steps of:

responding to a press of a second one of said two buttons to change a shape of a displayed cursor;

responding to a movement of the displayed cursor while said second button is pressed to change a size of a ghost image of said slider as displayed; and responding to a release of said second button to resize said slider.

3. The method as in claim 1 wherein said user selection of the slider and performing a resizing operation is performed using a two button pointing device and comprises the step of responding to a press of a second one of said two buttons when a displayed cursor is within the scroll bar to change the size of the slider depending on whether the cursor is within or outside of the slider.

4. The method as in claim 3 wherein the size of the slider is changed by moving an end of the slider to a location of the cursor.

5. The method as in claim 3 wherein the size of the slider is changed incrementally with each press of the second button.

6. The method as in claim 1 wherein the steps of responding to a user selection of the slider and performing a resizing operation on the slider is performed with a pointing device having at least one button and comprises the steps of:

in response to a press of said one button, determining if a displayed cursor is within the scroll bar;

if the displayed cursor is within the scroll bar, changing a shape of the displayed cursor when the cursor is proximate an end of the slider;

responding to a movement of the cursor while said one button is pressed to change a size of a ghost image of said slider as displayed; and responding to a release of said one button to resize said slider.

7. A method of changing a scale of a drawing in a computer graphics application program comprising the steps of:

displaying scroll bars along a plurality of axes of the drawing, said scroll bars each including a slider a position of which within the bar indicates a relative location of a working area relative to a virtual screen and a size of which indicates a relative size of the working area as a function of a total size of the virtual screen;

responding to a user selection of a slider of a first one of said scroll bars and performing a resizing operation of the selected slider;

changing a scale of the drawing along a first axis of the drawing corresponding to scroll bar of the selected first slider as a function of the resizing of the slider while constraining a center of interest of the drawing to a fixed location within the working area of the drawing by calculating a size and location of the selected first slider within the scroll bar as a result of the resizing operation, comparing the calculated size and location of the selected first slider with maximum and minimum limits, and ignoring a change in scale of the drawing beyond the maximum and minimum limits, thereby constraining the center of interest of the drawing;

responding to a user selection of a second slider of a second one of said scroll bars and performing a resizing operation of the slider; and changing a scale of the drawing along a second axis of the drawing corresponding to scroll bar of the selected second slider independent of the change of scale of the drawing along said first axis while constraining a center of interest of the drawing to a fixed location within the working area of the drawing by calculating a size and location of the selected second slider within the scroll bar as a result of the resizing operation, comparing the calculated size and location of the selected second slider with maximum and minimum limits, and ignoring a change in scale of the drawing beyond the maximum and minimum limits, thereby constraining the center of interest of the drawing;

whereby the scale of the drawing is changed along each axis as a function of the change in size of the slider for the scroll bar for that axis independent of a change in scale along other axes.

8. The method as in claim 7 wherein said user selection of the slider and performing a resizing operation is performed using a two button pointing device and comprises the step of responding to a press of a second one of said two buttons when a displayed cursor is within the scroll bar to change the size of the slider depending on whether the cursor is within or outside of the slider.

9. The method as in claim 8 wherein the size of the slider is changed by moving an end of the slider to a location of the cursor.

10. The method as in claim 8 wherein the size of the slider is changed incrementally with each press of the second button.

11. A computer graphics apparatus used to generate and edit a drawing in a graphics application program comprising:

a pointing device with at least one button;

a display device which displays a pointing cursor, directed by the pointing device, and a plurality of scroll bars each with a slider, a position of a slider within a scroll bar indicating a relative location of a working area relative to a virtual screen and a size of said slider indicating a relative size of the working area as a function of a total size of the virtual screen; and a central processing unit responsive to a user selection of a slider by positioning said pointing cursor within said scroll bar and pressing a button to perform a resizing operation on the slider and to change a scale of the drawing as a function of the resizing of the slider while constraining a center of interest of the drawing within a working area of the drawing by calculating a size and location of the selected slider within the scroll bar as a result of the resizing operation, comparing the calculated size and location of the selected slider with maximum and minimum limits, ignoring a change in scale of the drawing beyond the minimum limit, thereby constraining the center of interest of the drawing, computing sizes of sliders of other scroll bars as a function of the resizing of the selected slider, comparing the computed sizes of said sliders with maximum and minimum limits, and ignoring a change in scale of the drawing beyond the minimum limit of any of said sliders, thereby constraining the center of interest of the drawing.

12. A computer graphics apparatus as in claim 11 wherein said pointing device has two buttons and said central processing unit responds to a press of a second one of said two buttons to change a shape of a displayed cursor, responding to a movement of the displayed cursor while said second button is pressed to change a size of a ghost image of said slider as displayed, and responding to a release of said second button to resize said slider.

13. A computer graphics apparatus as in claim 11 wherein said pointing device has two buttons and said central processing unit responds to a press of a second one of said two buttons when a displayed cursor is within the scroll bar to change the size of the slider depending on whether the cursor is within or outside of the slider.

14. A computer graphics apparatus as in claim 11 wherein a pointing device has at least one button and said central processing unit responds to a press of said one button to determine if a displayed cursor is within the scroll bar, and if the displayed cursor is within the scroll bar, said central processing unit changes a shape of the displayed cursor when the cursor is proximate an end of the slider, said central processing unit further responding to a movement of the cursor while said one button is pressed to change a size of a ghost image of said slider as displayed, and said central processing unit responding to a release of said one button to resize said slider.

15. A computer graphics apparatus as in claim 11 wherein said display device displays scroll bars along a plurality of axes of the drawing and wherein when said central processing unit resizes one slider within one of said scroll bars the central processing then resizes the sliders of other scroll bars according to the resizing of said one slider corresponding to a change of scale of the drawing.

16. A computer graphics apparatus as in claim 11 wherein said display device displays scroll bars along a plurality of axes of the drawing and wherein said central processing unit resizes one slider within one of said scroll bars independently of a resizing of a slider within another of said scroll bars, said central processing unit changing a scale of the drawing on each axis independent of a change of scale along any other axis.

17. The computer graphics apparatus recited in claim 11 wherein the central processing unit pans the working area of the drawing along axes of the other scroll bars in response to a change in scale of the drawing beyond the maximum limits.

18. A method of changing a scale of a drawing in a computer graphics application program comprising the steps of:

displaying scroll bars along a plurality of axes of the drawing, said scroll bars each including a slider a position of which within the bar indicates a relative location of a working area relative to a virtual screen and a size of which indicates a relative size of the working area as a function of a total size of the virtual screen;

responding to a user selection of a slider of a first one of said scroll bars and performing a resizing operation on the slider; and changing a scale of the drawing as a function of the resizing of the slider while constraining a center of interest of the drawing to a fixed location within the working area of the drawing by calculating a size and location of the selected slider within the scroll bar as a result of the resizing operation, comparing the calculated size and location of the selected slider with maximum and minimum limits, ignoring a change in scale of the drawing beyond the minimum limit, thereby constraining the center of interest of the drawing, and panning the working area of the drawing along an axis of the scroll bar of the selected slider in response to a change in scale of the drawing beyond the maximum limit, computing sizes of sliders of other scroll bars as a function of the resizing of the selected slider, comparing the computed sizes of said sliders with maximum and minimum limits, and ignoring a change in scale of the drawing beyond the maximum limit of any of said sliders, thereby constraining the center of interest of the drawing, and panning the working area of the drawing along axes of the other scroll bars in response to a change in scale of the drawing beyond the maximum limit.

19. The method as in claim 18 wherein said user selection of the slider and performing a resizing operation is performed using a two button pointing device and comprises the step of responding to a press of a second one of said two buttons when a displayed cursor is within the scroll bar to change the size of the slider depending on whether the cursor is within or outside of the slider.

20. The method as in claim 19 wherein the size of the slider is changed by moving an end of the slider to a location of the cursor.

21. The method as in claim 19 wherein the size of the slider is changed incrementally with each press of the second button.

* * * * *